June 25, 1957 W. C. PIERCE 2,796,962
MAGNETIC CLUTCH WITH STATIONARY WINDING
Filed Dec. 16, 1955
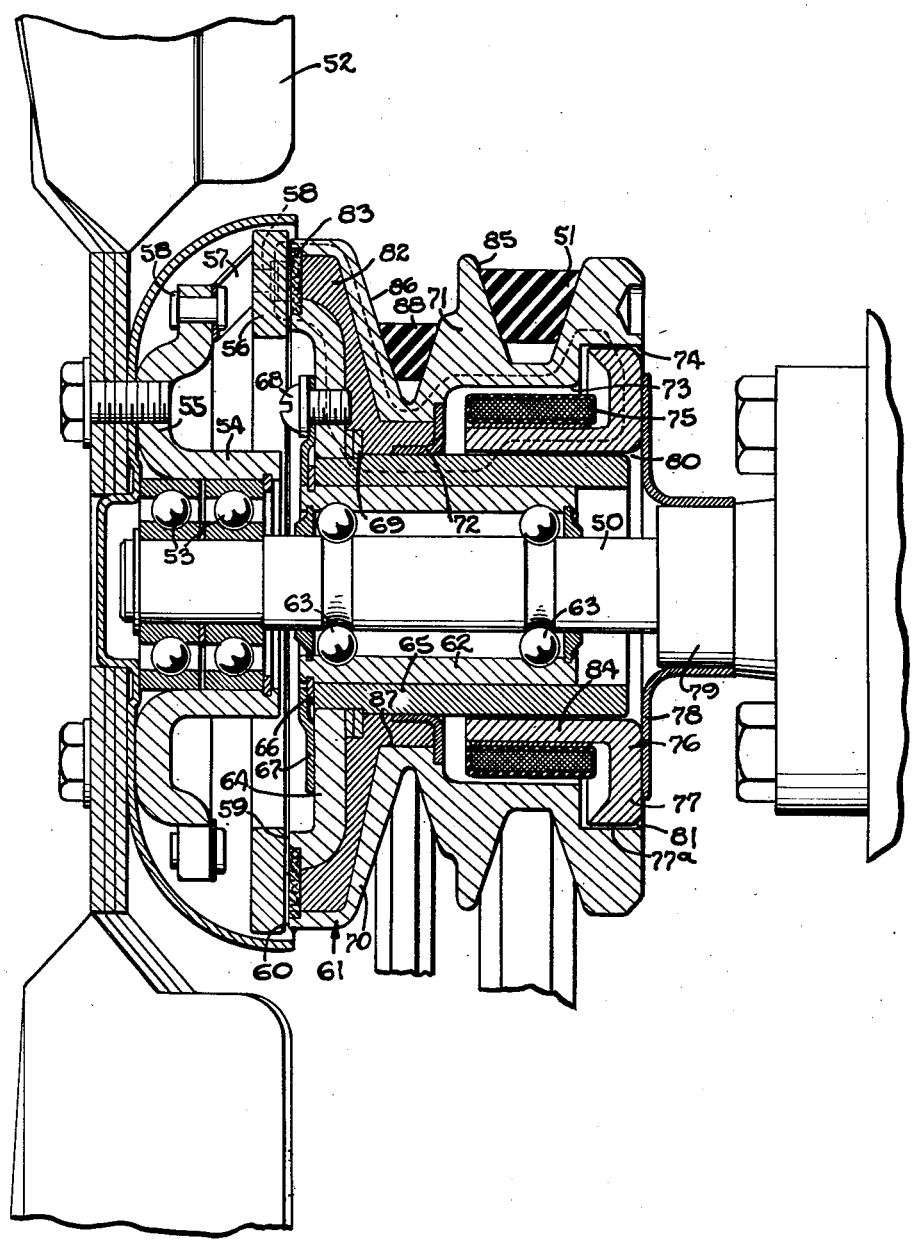
INVENTOR
William C. Pierce
By Carlson, Pitzner, Hubbard Wolfe
ATTORNEY

United States Patent Office 2,796,962
Patented June 25, 1957

2,796,962

MAGNETIC CLUTCH WITH STATIONARY WINDING

William C. Pierce, Beloit, Wis., assignor to Warner Electric Brake & Clutch Company, South Beloit, Ill., a corporation of Illinois Application December 16, 1955, Serial No. 553,658

6 Claims. (Cl. 192—84)

This invention relates to a magnetic clutch of the type having a stationarily mounted winding enclosed by a toroidal flux circuit which extends through a stationary magnet core, an armature ring and a pole piece unit having one or more V-belt grooves therein.

The general object is to improve upon prior clutches of the above character by providing greater overall compactness both radially and axially, greater rigidity of the rotating pole piece unit, reduced overhang of the rotating parts, and reduced cost of manufacture through the use of parts which may be formed as sheet metal stampings.

A more detailed object is to provide a clutch of the above character in which the inner pole piece of the rotating pole unit is disposed within the stationary magnet core and the outer pole piece of the unit encircles the outer periphery of a flange on the core.

The invention also resides in the novel manner of joining the inner and outer pole pieces of the rotating unit, and in the arrangement of the parts to permit the inner pole ring to be supported in the plane of the magnet and belt grooves of minimum diameter to be formed around the outer pole ring.

Other objects and advantages of the invention will become apparent from the following detailed description taken in connection with the accompanying drawing which is a diametrical sectional view of the improved clutch and its mounting.

In the form shown in the drawing for purposes of illustration, the improved clutch is mounted on a stationary shaft 50 and operates to control the transmission of rotary power from a drive belt 51 to a fan 52. Bearings 53 on the outer end of the shaft support the fan hub 54 which has a flange 55 carrying the driven clutch element or armature 56. The latter comprises a flat iron ring supported by a plurality of tangentially disposed leaf springs 57 angularly spaced around the armature with the opposite ends of each strip riveted as indicated at 58 to the flange 55 and the armature, the latter thus being urged axially to the normal clutch-released position shown.

The armature spans and is adapted for axial gripping engagement with inner and outer pole faces 59 and 60 on a pole unit 61 which constitutes the driving element of the clutch and is carried by a sleeve 62 journaled on the shaft through bearings 63. The inner pole face is on the laterally bent edge of a right angular flange 64 swaged onto the end of a sleeve 65 closely telescoped around the sleeve 62 and locked to the latter by a snap ring 66 and a clamping ring 67 overlapping the snap ring and secured to the flange by screws 68. The flux carrying capacity of the flange joint is increased by iron washers 69 pressed onto the sleeve 65 and lying against the inner edge of the flange.

The outer pole face 60 is on the laterally turned edge of a frusto-conically flanged portion 70 forming one end portion of a tubular iron ring 71 encircling and substantially coextensive with the inner pole ring formed by the sleeve 65 and its flange 64. Near the inner edge of the flange 70, the ring 71 is connected rigidly to the sleeve 65 by a ring 72 of nonmagentic metal and L-shaped cross section, opposite edges of the connector ring preferably being welded to the pole rings 65 and 71. The rigidity of the connection is increased by filling the space between the pole flanges 64 and 70 with rigid moldable material 82 such as a cold setting resin. This filling also provides part of the rigid backing for segments 83 of nonmagnetic friction material which spans the poles and are seated on undercut shoulders around the latter. These segments provide a rigid friction surface substantially flush with the pole faces 59 and 60.

Beyond the connector 72, the outer ring 71 is enlarged internally to a diameter 73 and counterbored to a larger diameter 74 at the ring end. The stepped walls 73 and 74 cooperate with the external surface of the sleeve 65 to form a recess for receiving a magnet comprising a multiple turn winding 75 secured to an iron core 76 preferably of L-shaped radial cross section. The outturned substantially right angular flange 77 of the core lies substantially in the plane of the ends of the pole rings 65 and 71 where the flange is exposed for connection as by welding to a mounting ring 78. The latter is telescoped on and brazed or otherwise secured to an adjacent enlargement 79 of the shaft 50. The magnet core is thus supported stationarily and precisely concentric with the sleeve 65 and with the cylindrical surface 74 in the outer pole ring. This surface is only slightly larger than the outer periphery of the flange 77 which is widened slightly by reverse bending of the flange end.

The rigid mounting of the core 76 also provides for close telescoping of the longer and cylindrical portion 84 with the external surface of the inner pole sleeve 65. The two large area surfaces are thus separated from each other by a narrow radial gap 80 of the same width as the larger diameter but axially shorter gap 81 between the core flange and the outer pole ring.

The winding 75 is relatively thin radially and elongated axially so that the surface 73 of the outer pole ring may be of minimum diameter. The winding is thus disposed within a toroidal flux path shown in phantom and extending from the armature 56 through the inner pole face 59, the flange 64, the sleeve 65, the inner gap 80, the stationary core 76, the outer gap 81, and thence through the full length of the outer pole ring 71 to the outer pole face 60. The flux threading this path when the winding is energized draws the armature axially into gripping engagement with the pole faces and friction segments 83. Although the winding is of relatively small diameter, the torque exerted on the fan is of substantial magnitude owing to the considerably larger diameter of the pole faces which are worked near saturation by virtue of the substantial uniformity in the area of the toroidal flux path at all points and the large area of the smaller diameter air gap 80.

By enlarging axially spaced portions of the outer pole ring 71, the latter may be utilized as a sheave having one groove 85 for receiving the drive belt 51 and a second preferably smaller diameter groove 86 for engaging another or power take off belt 88. The drive groove 85 is disposed in the plane of the pole ring surface 73 and between the two bearings 63 while the groove 86 is similarly disposed between these bearings and in the plane of the smaller internal surface 87 of the outer pole ring. By such location of the grooves and the rigid connection of the inner and outer pole rings intermediate their ends, extreme rigidity in the construction and mounting of the rotating pole unit is achieved while at the same time promoting both axial and radial compactness of the clutch as a whole. At the same time, adequate cross sectional area is maintained along the entire length of the toroidal flux path to achieve the desired high density of the working flux at the pole faces 59 and 60 in spite of the substantial diameter of these faces as compared to the size of the winding 75.

I claim as my invention:

1. In a magnetic clutch, the combination of an elongated sleeve of magnetic material having an outturned flange at one end terminating in an axially facing pole face, means rotatably supporting said sleeve to turn about its axis, an elongated tubular magnetic core closely telescoping with a substantial length of said sleeve at the opposite end, an outturned flange integral with said core adjacent said last mentioned sleeve end and having an external peripheral surface, means stationarily supporting said core form the flanged end thereof, a multiple turn winding radially narrower than said core flange surrounding and supported by the core adjacent the flange thereof, and an outer tubular magnetic ring surrounding said core, said winding and said sleeve and closely telescoping at one end with said core flange surface, an outturned flange at the other end of said outer ring terminating in an axially facing pole face, and nonmagnetic means intermediate the ends of said sleeve and outer ring and rigidly joining the two with said pole faces substantially flush with each other, said outer ring having an external belt groove disposed in the plane of said winding and having a bottom of smaller diameter than said core flange surface.

2. In a magnetic clutch, the combination of, a magnetic core sleeve, a winding encircling said sleeve intermediate the ends thereof, a substantially right angular flange integral with one end of said sleeve and projecting outwardly beyond said winding, means stationarily supporting said flange, an inner tubular magnetic ring projecting through and closely telescoping with the interior of said core sleeve and mounted to turn about the axis thereof, an outer tubular pole ring enclosing said winding and said flange and closely telescoping with the outer periphery of the flange, a nonmagnetic connector rigidly joining said inner and outer rings adjacent but beyond the other end of said first sleeve, and pole flanges on the ends of said inner and outer rings flaring outwardly beyond said connector and terminating in axially facing pole faces lying in a common transaxial plane, said pole flanges, said core sleeve, said rings, and said first flange providing a toroidal flux path enclosing said winding and said connector.

3. A clutch as defined in claim 2 in which said outer pole ring is formed with one internal surface telescoping with said first flange, a second surface of smaller diameter closely encircling said winding, and a third smaller surface closely encircling said inner ring.

4. A clutch as defined in claim 3 in which said outer pole ring is formed with axially spaced external peripheral grooves lying substantially in the planes of said second and third internal surfaces.

5. In a magnetic clutch, the combination of, a magnetic core sleeve, a winding encircling said sleeve intermediate the ends thereof, a flange integral with one end of said core sleeve and projecting outwardly beyond said winding, means stationarily supporting said flange, an inner magnetic pole sleeve projecting through and closely telescoping with the interior of said core sleeve and mounted to turn about the axis thereof, an outer tubular pole ring enclosing said winding and said flange and closely telescoping with the outer periphery of the flange, a nonmagnetic connector rigidly joining said inner sleeve and outer ring adjacent but beyond the other end of said core sleeve, and inner and outer pole flanges on the ends of said inner sleeve and outer ring terminating in axially facing pole faces lying in a common transaxial plane, said inner pole flange comprising a generally flat disk pressed onto the end of said inner pole sleeve with its outer periphery bent laterally to dispose said inner pole face in said plane.

6. In a magnetic clutch, the combination of, a magnetic core sleeve, a winding encircling said sleeve intermediate the ends thereof, a flange integral with one end of said core sleeve and projecting outwardly beyond said winding, means stationarily supporting said flange, an inner magnetic pole sleeve projecting through and closely telescoping with the interior of said core sleeve and mounted to turn about the axis thereof, an outer tubular pole ring enclosing said winding and said flange and closely telescoping with the outer periphery of the flange, a nonmagnetic connector rigidly joining said inner sleeve and outer ring adjacent but beyond the other end of said core sleeve, inner and outer pole flanges on the ends of said inner sleeve and outer ring flaring outwardly beyond said connector and terminating in axially facing pole faces lying in a common transaxial plane and being of diameters substantially larger than said core sleeve and flange, said pole flanges, said sleeves, said ring, and said first flange providing a toroidal flux path enclosing said winding and said connector.

No references cited.